(12) United States Patent
Hunt

(10) Patent No.: US 9,505,130 B2
(45) Date of Patent: Nov. 29, 2016

(54) SYSTEM AND METHOD FOR PERFORMING REMOTE WELDING OPERATIONS ON AN APPARATUS

(75) Inventor: Mark Lawrence Hunt, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 300 days.

(21) Appl. No.: 13/548,253

(22) Filed: Jul. 13, 2012

(65) Prior Publication Data

US 2014/0014637 A1 Jan. 16, 2014

(51) Int. Cl.
*B23K 9/12* (2006.01)
*B25J 9/16* (2006.01)

(52) U.S. Cl.
CPC .... *B25J 9/1689* (2013.01); *G05B 2219/39387* (2013.01); *G05B 2219/40169* (2013.01); *G05B 2219/40195* (2013.01); *G05B 2219/45104* (2013.01)

(58) Field of Classification Search
CPC ................. B25J 9/1689; G05B 2219/39387; G05B 2219/40169; G05B 2219/40195; G05B 2219/45104
USPC ................... 219/124.22, 130.1, 130.21, 147; 348/187, 143, 90; 700/245, 110; 2/8.2
See application file for complete search history.

(56) References Cited

U.S. PATENT DOCUMENTS

| | | | |
|---|---|---|---|
| 5,436,542 A | 7/1995 | Petelin et al. | |
| 6,470,236 B2* | 10/2002 | Ohtsuki | B25J 9/1689 345/157 |
| 6,479,792 B1 | 11/2002 | Beiermann et al. | |
| 6,518,995 B1 | 2/2003 | Ghole | |
| 6,624,388 B1 | 9/2003 | Blankenship et al. | |
| 6,758,875 B2* | 7/2004 | Reid et al. | 55/385.2 |
| 7,129,442 B2 | 10/2006 | Ruthven et al. | |
| 7,605,347 B2* | 10/2009 | Izawa et al. | 219/124.34 |

(Continued)

FOREIGN PATENT DOCUMENTS

| | | | |
|---|---|---|---|
| AT | WO 2011/029118 A2 * | 3/2011 | |
| FR | 2957000 | 3/2002 | |

(Continued)

OTHER PUBLICATIONS

Hou Ming et al. On Teleoperation of an Arc Welding Robotic System—Robotics and Automation 1996 (6 Pages).

(Continued)

*Primary Examiner* — Dana Ross
*Assistant Examiner* — Kuangyue Chen
(74) *Attorney, Agent, or Firm* — Dority & Manning, P.A.

(57) ABSTRACT

A system for performing remote welding operations on an apparatus is disclosed. The system may generally include a welding chamber configured to house the apparatus and a robotic welder positioned within the welding chamber. The robotic welder may be configured to perform an actual welding operation on the apparatus. In addition, the system may include a welding simulation device positioned outside the welding chamber and a controller communicatively coupled to the robotic welder and the welding simulation device. The welding simulation device may be configured to perform a simulated welding operation corresponding to the actual welding operation. The controller may be configured to track the movement of the welding simulation device and control the operation of the robotic welder based on the movements of the welding simulation device.

15 Claims, 3 Drawing Sheets

(56) References Cited

U.S. PATENT DOCUMENTS

| | | |
|---|---|---|
| 7,930,065 B2 | 4/2011 | Larkin et al. |
| 2003/0089087 A1 | 5/2003 | Reid et al. |
| 2005/0065653 A1* | 3/2005 | Ban et al. ............ 700/245 |
| 2008/0218592 A1* | 9/2008 | Jahn ..................... 348/187 |
| 2009/0089700 A1* | 4/2009 | Gu et al. ............... 715/771 |
| 2009/0098898 A1* | 4/2009 | Patterson ............. 455/521 |
| 2010/0140240 A1 | 6/2010 | Turner |
| 2010/0174395 A1* | 7/2010 | Gu et al. ............... 700/110 |
| 2010/0223706 A1* | 9/2010 | Becker et al. .......... 2/8.2 |
| 2010/0224611 A1 | 9/2010 | Kapoor et al. |
| 2011/0083241 A1 | 4/2011 | Cole |
| 2011/0091846 A1* | 4/2011 | Kreindl et al. ........ 434/234 |
| 2012/0229632 A1* | 9/2012 | Hoertenhuber et al. ...... 348/143 |

FOREIGN PATENT DOCUMENTS

| | | |
|---|---|---|
| JP | 7299561 | 11/1995 |
| JP | 9076063 | 3/1997 |
| JP | 2002096169 | 4/2002 |
| JP | 2003230959 | 8/2003 |

OTHER PUBLICATIONS

EP Search Report—Application No. 13174905.3—1807 / 2684650. Dated Apr. 9, 2015 (9 Pages).

* cited by examiner

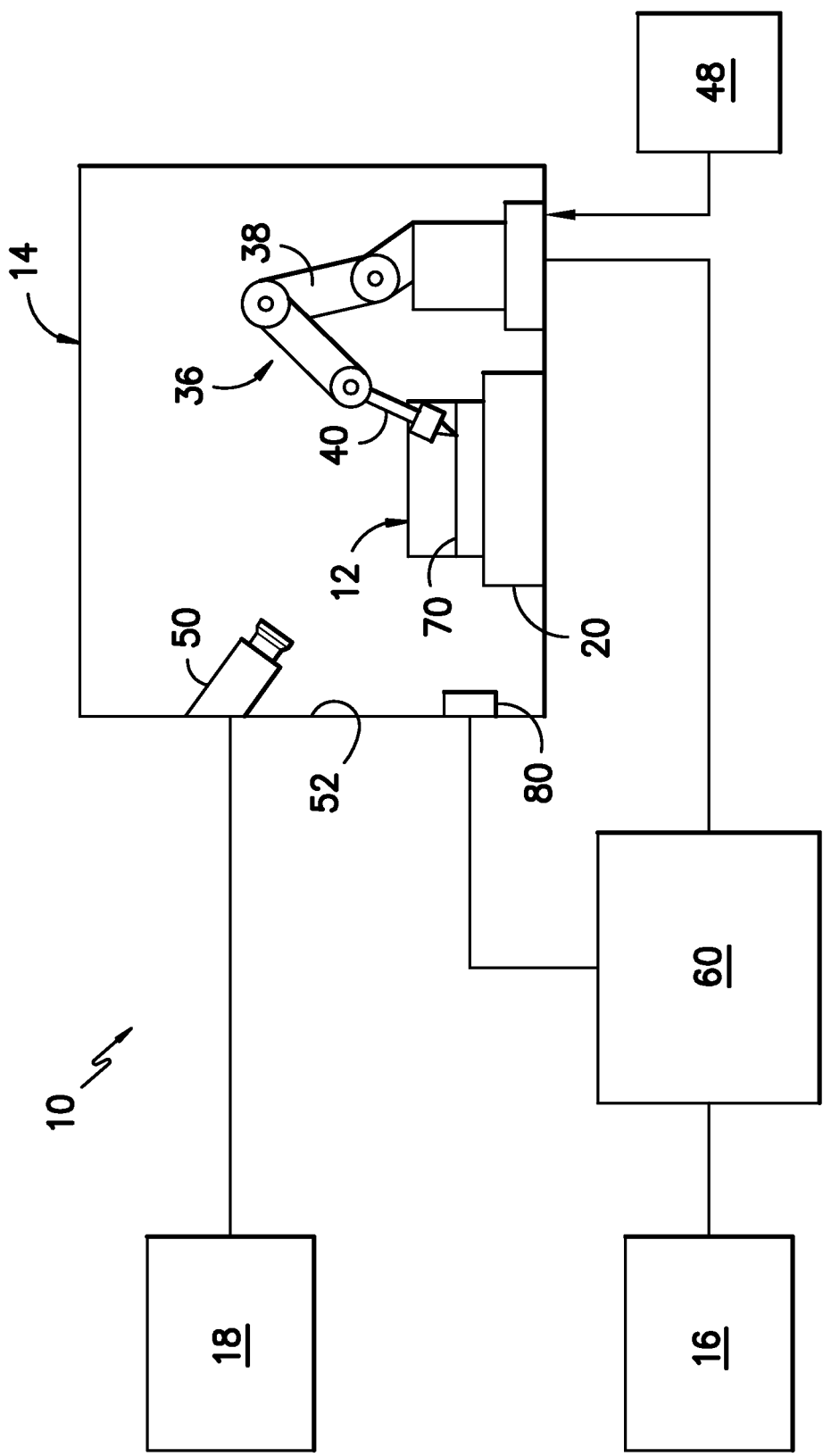
FIG. -1-

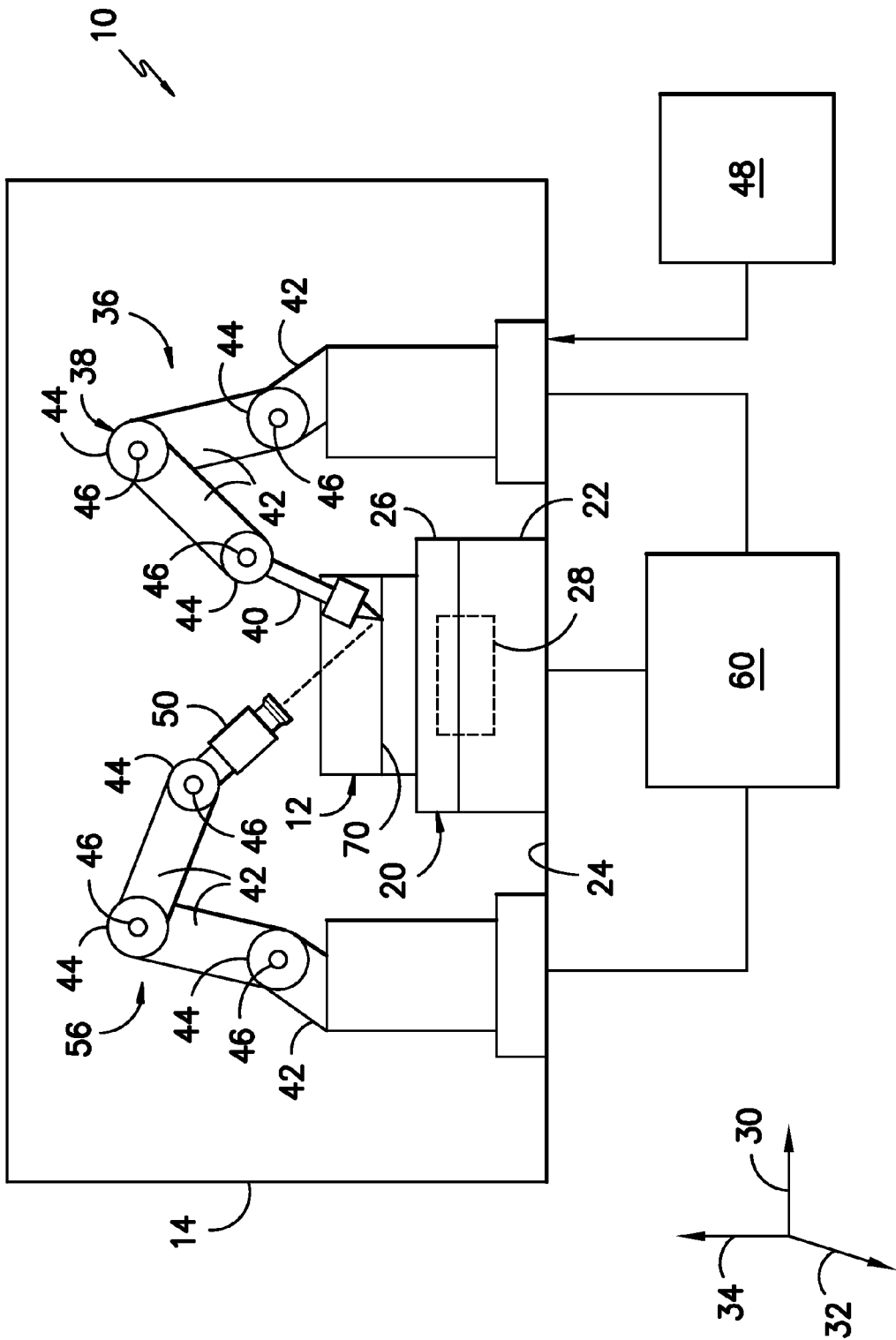
FIG. -2-

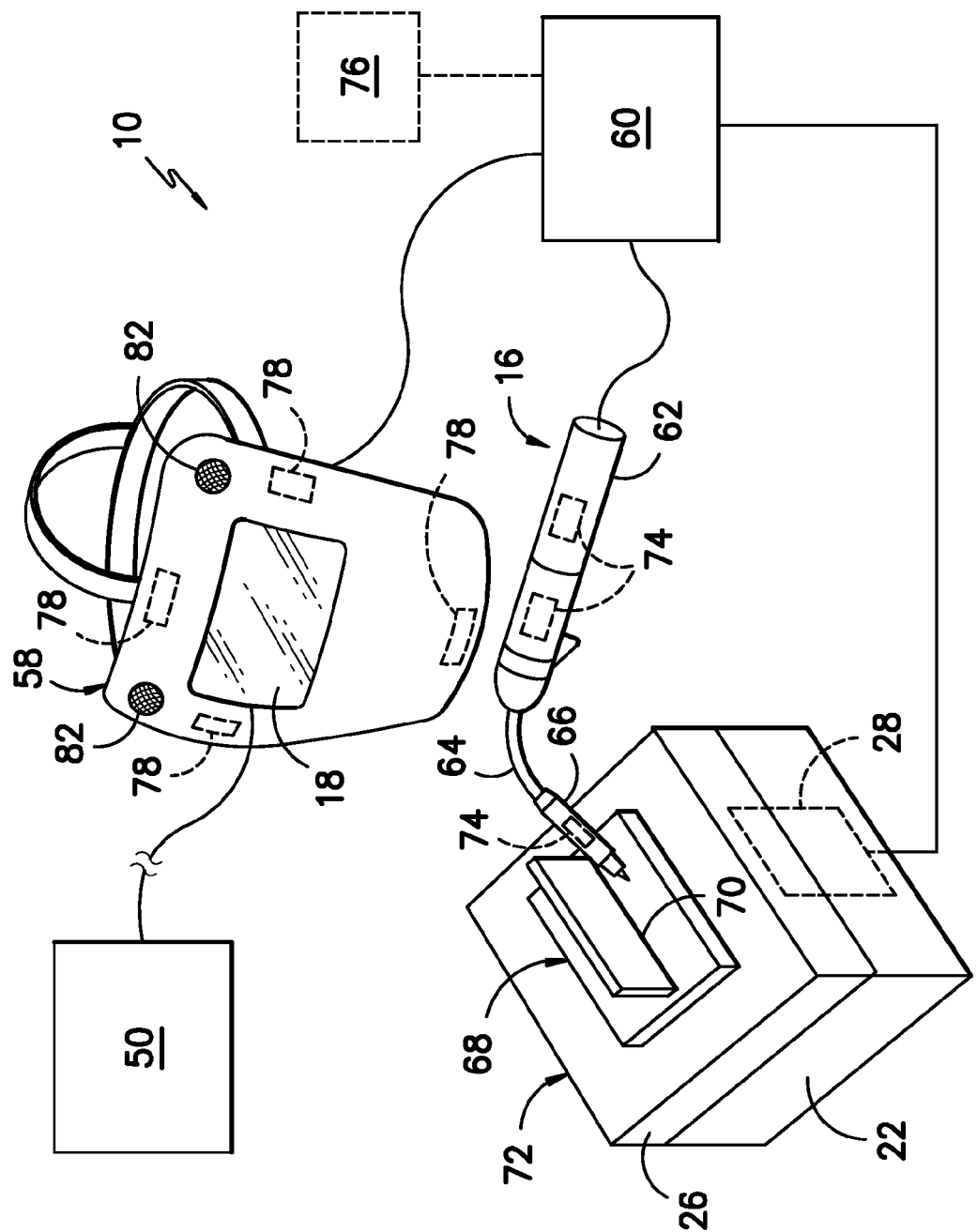
FIG. -3-

SYSTEM AND METHOD FOR PERFORMING REMOTE WELDING OPERATIONS ON AN APPARATUS

FIELD OF THE INVENTION

The present subject matter relates generally to a system and method for performing remote welding operations on an apparatus and, more particularly, to a system that utilizes a welding simulation device to control the motion of a robotic welder configured to perform welding operations on an apparatus positioned within a welding chamber.

BACKGROUND OF THE INVENTION

To perform welding operations on components formed from certain metals and alloys, the components must be placed in a controlled environment and/or must be heated to a relatively high temperature before and/or during the welding process. As a result, welding operations are often performed on such components within a welding chamber, wherein the environment can be closely monitored and controlled. For example, conventional welding chambers may be configured to be filled with an inert gas or other suitable gas in order to facilitate welding of the components contained therein. In addition, such welding chambers may allow for the temperature and/or pressure of the gas-filled environment to also be controlled.

Current welding techniques require that a welder gain internal access to the welding chamber in order to actually perform welding operations. Thus, conventional welding chambers typically include access features, such as windows or other portals, that are configured to provide internal access to the welder. However, such access features typically result in a compromised design of the welding chamber. For instance, air leaks often occur as a result of the access features, leading to contamination of the controlled environment contained within the welding chamber. Moreover, when a welding chamber is heated, exposure to the heat can create a safety risk for the welder, thereby limiting the amount of time that the welder can perform welding operations within the welding chamber.

Accordingly, a system and method for performing remote welding operations on an apparatus contained within a welding chamber would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for performing remote welding operations on an apparatus. The system may generally include a welding chamber and a robotic welder positioned within the welding chamber. The robotic welder may be configured to perform an actual welding operation on the apparatus. In addition, the system may include a welding simulation device positioned outside the welding chamber and a controller communicatively coupled to the robotic welder and the welding simulation device. The welding simulation device may be configured to perform a simulated welding operation corresponding to the actual welding operation. The controller may be configured to track the movement of the welding simulation device and control the operation of the robotic welder based on the movements of the welding simulation device.

In another aspect, the present subject matter is directed to a method for performing remote welding operations an apparatus contained within a welding chamber. The method may generally include performing a simulated welding operation with a welding simulation device positioned outside the welding chamber, tracking the movements of the welding simulation device as the simulated welding operation is being performed and controlling a robotic welder positioned within the welding chamber based on the movements of the welding simulation device such that the robotic welder performs an actual welding operation on the apparatus.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a simplified, schematic diagram of various components that may form all or part of one embodiment of a system for performing remote welding operations on an apparatus;

FIG. 2 illustrates an internal view of one embodiment of a welding chamber 14 that may be utilized with the disclosed system, particularly illustrating various components that may be housed within the welding chamber; and FIG. 3 illustrates a perspective view of one embodiment of a welding simulation device and a display device that may be utilized with the disclosed system.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for performing remote welding operations on an apparatus. In several embodiments, a welding simulation device, such as an actual or model welding torch, may be controlled by a user in order to perform simulated welding operations. The movements of the welding simulation device may be tracked by a controller (e.g., by using sensors and/or a motion tracking system) and used to control the movements of a robotic welder. As such, while the user is performing a simulated welding operation with the welding simulation device, the robotic welder may simultaneously perform an actual welding operation on an apparatus located remote to the user.

It should be appreciated that, by utilizing the disclosed system, welding operations may be controlled from a remote location. Specifically, in several embodiments, the robotic welder may be located within a welding chamber. In such embodiments, the user may be able to control the welding operation occurring within the welding chamber without gaining internal access to the chamber and/or otherwise comprising the integrity of the controlled environment within the chamber. For instance, the disclosed system may include a camera or other imaging system (e.g., an infrared imaging system) configured to capture images of the interior of the welding chamber, which may then be displayed to the user via a suitable display device. By providing a means to display such images, the user may view the actual welding operation being performed in the welding chamber as he/she performs the simulated welding operation. As such, the user may be located at any suitable location at which images from the camera may be transmitted to the display device and signals associated with the movements of the welding simulation device may be transmitted to the robotic welder. For instance, in one embodiment, the user may be located relatively proximal to the location at which the actual welding operations are being performed, such as by being located within the same room as the welding chamber. In such an embodiment, the various components of the system may be directly coupled to one another via suitable communicative links (e.g., suitable cables). Alternatively, the user may be located at any other location around globe, such as by being located in a different building, city and/or country as the location of the welding chamber. In such an embodiment, the various components of the system may be communicatively coupled to one another via a suitable network (e.g., the internet) and/or any other suitable communicative coupling.

Referring now to the drawings, FIGS. 1-3 illustrate several embodiments of a system 10 for remotely performing welding operations on an apparatus 12. In particular, FIG. 1 illustrates a simplified, schematic diagram of various components that may form all or part of one embodiment of the disclosed system 10. FIG. 2 illustrates an internal view of one embodiment of a welding chamber 14 that may be utilized with the disclosed system 10, particularly illustrating various components that may be housed within the welding chamber 14. Additionally, FIG. 3 illustrates a perspective view of one embodiment of a welding simulation device 16 and a display device 18 that may be utilized with the disclosed system 10.

It should be appreciated that the apparatus 12 being welded may generally comprise any suitable object and/or combination of objects to which a welding operation is desired to be performed. For instance, in several embodiments, the apparatus may comprise one or more part(s) and/or component(s) that are being assembled and/or repaired during the performance of the welding operation. Additionally, it should be appreciated that, as used herein, the term "welding operation" may refer to any suitable welding operation known in the art, such as the joining of two components or the cladding build-up of a surface.

As particularly shown in FIG. 1, in several embodiments, the system 10 may include a welding chamber 14. In general, the welding chamber 14 may comprise any suitable chamber, vessel and/or other container known in the art that is configured to have welding operations performed therein. For instance, the welding chamber 14 may define an enclosed, sealed volume such that a controlled environment may be maintained within the chamber 14. As such, the welding chamber 14 may, in one embodiment, be filled with an inert gas or other suitable gas in order to facilitate and/or enhance the welding operations performed therein. Similarly, the welding chamber 14 may be adapted so as to control the pressure and/or the temperature of the gas contained therein, thereby providing a means for adjusting the atmospheric conditions within the chamber 14.

In addition, the welding chamber 14 may be configured to house various components of the disclosed system 10. For instance, in several embodiments, the system may include a fixture 20 for mounting and/or positioning the apparatus 12 within the welding chamber 14. In general, the fixture 20 may have any suitable configuration that allows the apparatus 12 to be mounted or otherwise secured within the welding chamber 14. For instance, as shown in FIG. 2, in one embodiment, a bottom portion 22 of the fixture 20 may be mounted to a bottom surface 24 of the welding chamber 14, such as by welding the bottom portion 22 to the bottom surface 24 and/or by coupling the bottom portion 22 to the bottom surface 24 using suitable mechanical fasteners (e.g., bolts, screws, pins, rivets, brackets and/or the like). Similarly, a top portion 26 of the fixture 20 may include any suitable features and/or have any suitable configuration that permits the apparatus 12 to be mounted thereto. For example, the top portion 26 may be configured to receive various mechanical fasteners for coupling the apparatus 12 to the fixture 20. In addition to the mechanical fasteners or as an alternative thereto, the top portion 26 may include one or more locking mechanisms (e.g., clamps, tie-downs and/or the like) and/or positioning features (recessed channels, pins and/or the like) for coupling and/or positioning the apparatus to and/or on the fixture 20.

Moreover, in several embodiments, the orientation of at least a portion of the fixture 20 may be adjustable. Specifically, as shown in FIG. 2, the fixture 20 may include one or more suitable displacement mechanisms 28 (e.g., one or more motors) configured to adjust the orientation of at least a portion of the fixture 20. For instance, in one embodiment, the top portion 26 of the fixture 20 may be configured to be rotated and/or tilted in one or more directions (e.g., about the three-dimensional axes 30, 32, 34 shown in FIG. 2) relative to the bottom portion 22 of the fixture 20, thereby allowing the orientation of the apparatus 12 to be adjusted within the welding chamber 14.

Further, as particularly shown in FIGS. 1 and 2, the system 10 may also include a robotic welder 32 positioned within the welding chamber 14 for performing welding operations on the apparatus 12. In general, the robotic welder 32 may comprise any suitable electronically controlled, robotic welding device known in the art. For instance, in several embodiments, the robotic welder 32 may include a robotic arm 38 configured to control the movement of a suitable welding torch 40 coupled thereto. As shown in FIG. 2, the robotic arm 38 may include a plurality of arm segments 42 coupled together at a plurality of joints 44, with the welding torch 40 being coupled to the end of the robotic arm 38. As is generally understood, suitable displacement mechanisms 46 (e.g., suitable servo-motors) may be disposed at the joints 44 such that the arm segments 42 may be displaced relative to one another, thereby permitting the robotic arm 38 to position the welding torch 40 at any suitable location within the welding chamber 14. For instance, the displacement mechanisms 46 may be configured to displace the arm segments 42 in any suitable direction, such as by translating the arm segments 42 relative to one another along any of the three axes 30, 32, 34 shown in FIG. 2 and/or by rotating the arm segments 42 relative to one another about any of the three axes 30, 32 34 shown in FIG. 2. Accordingly, the welding torch 40 may be positioned and/or oriented relative to the apparatus 12 in any suitable manner that allows for a desired welding operation to be performed on the apparatus 12. Moreover, as will be described below, in several embodiments, the movements of the robotic arm 38 and, thus, the welding torch 40 may be controlled based on user-controlled movements of a welding simulation device 16 of the disclosed system 10.

It should be appreciated that the welding torch 40 may generally have any suitable configuration that permits it to function as described herein. For instance, in several embodiments, the welding torch 40 may comprise a MIG welding torch and/or any other welding torch that receives an electrode from a continuous wire feeder 48 (FIGS. 1 and 2). However, in general, the welding torch 40 may comprise any welding torch configured to perform any suitable welding process (e.g., GMAW, GTAW, SMAW, PTAW and/or the like).

Referring still to FIGS. 1 and 2, the system 10 may also include an imaging system, such as a camera 50, associated with the welding chamber 14 for capturing images of the apparatus 12 and/or the welding torch 40 as a welding operation is being performed. As shown in FIG. 1, in one embodiment, the camera 50 may be mounted to the welding chamber 14, such as by being mounted to an inner wall 52 of the welding chamber 14.

In other embodiments, the camera 50 may be positioned at any other suitable location that permits images of the apparatus 12 and/or the welding torch 40 to be captured as a welding operation is being performed within the welding chamber 14. For instance, in several embodiments, the camera 50 may be mounted to a robotic arm 38, 56 positioned within the welding chamber 14. Specifically, in one embodiment, the camera 50 may be mounted to the robotic arm 38 associated with the robotic welder 36, such as by being mounted to one of the arms segments 42 of the robotic arm 36. As such, the camera 50 may be moved together with the welding torch 40 as a welding operation is being performed. In another embodiment, the camera 50 may be coupled to a secondary robotic arm 56 positioned within the welding chamber 14, thereby allowing movement of the camera 50 to be independent of the movement of the welding torch 40. For instance, as shown in FIG. 2, the secondary robotic arm 56 may be configured the same as or similar to the robotic arm 38 of the robotic welder 36. Thus, the secondary robotic arm 56 may include a plurality of arm segments 42 coupled together at suitable joints 44, with the arm segments 42 being configured to be displaced relative one another using suitable displacement mechanisms 46 disposed at the joints 44. Accordingly, the secondary robotic arm 56 may be configured to move the camera 50 to any suitable location within the welding chamber 14 that permits the camera 50 to capture images of a welding operation as it is being performed. Moreover, as will be described below, in several embodiments, the movement of the secondary robotic arm 56 and, thus, the camera 50 may be controlled based on the user's head movements.

It should be appreciated that the camera 50 may generally comprise any suitable image capture device known in the art. For instance, in several embodiments, the camera 50 may comprise a video camera and/or other suitable image capture device that is configured to continuously capture images of a welding operation being performed. For instance, in a particular embodiment, the camera 50 may comprise a pan-tilt-zoom (PTZ) video camera. As such, the camera 50 may be configured to independently rotate in various directions and zoom in and out to adjust the field of view of the camera 50 relative to the apparatus 12 and/or the welding torch 40. In other embodiments, the system 10 may include any other imaging system, such as an infrared imaging system.

Additionally, in several embodiments, the camera 50 may be communicatively coupled to a display device 18 positioned outside the welding chamber 14. In general, the display device 18 may be configured to display the images captured by the camera 50 to the user of the system 10, thereby providing a means for the user to view the interior of the welding chamber 14 and, more particularly, the position of the welding torch 40 relative to the apparatus 12. Thus, it should be appreciated that the display device 18 may generally comprise any suitable monitor, screen or other output device for presenting images to the user. For example, the display device may comprise a light-emitting diode (LED) display, an electroluminescent display (ELD), a plasma display panel (PDP), a liquid crystal display (LCD) and/or the like. Moreover, as will be described below, the display device 18 may, in some embodiments, comprise a head-mounted display device (e.g., by being integrated into a welder's hood 58 (FIG. 3)) configured to be worn on the user's head.

Referring particularly now to FIGS. 1 and 3, the system may also include a welding simulation device 16 positioned outside the welding chamber 14 and a controller 60 communicatively coupled to the welding simulation device 16. In general, the welding simulation device 16 may configured to provide user inputs for controlling the operation of the robotic welder 36. Additionally, the controller 60 may be configured to track the movements of the welding simulation device 16 and, based on such movements, control the robotic welder 36 so that the motion of the robotic welder 36 emulates the user-controlled motion of the welding simulation device 16. Accordingly, the welding simulation device 16 may be utilized to perform a simulated welding operation corresponding to the actual welding operation that is desired to be performed by the robotic welder 36, thereby allowing the user to control the welding operation performed on the apparatus 12 without gaining internal access to the welding chamber 14.

In general, the welding simulation device 16 may comprise any suitable object and/or assembly that may be manipulated by the user in order to manually perform a simulated welding operation that generally mimics the performance of an actual welding operation. For instance, as shown in FIG. 3, in several embodiments, the welding simulation device 16 may be configured as a welding torch and, thus, may include many or all of the components and/or features of a typical welding torch, such as a handle 62, pipe bend 64 and gas nozzle 66. Accordingly, during the performance of the simulated welding operation, the welding simulation device 16 may provide the user the physical experience of performing an actual welding operation. However, it should be appreciated that, in alternative embodiments, the welding simulation device 16 may have any other configuration that permits it to function as described herein. For instance, in one embodiment, the welding simulation device 16 may simply comprise a stylus or other suitable object that may be easily manipulated by the user.

Additionally, as shown in FIG. 3, in several embodiments, the welding simulation device 16 may be configured to perform the simulated welding operation on a model apparatus 68 having the same or a similar configuration as the apparatus 12 contained within the welding chamber 14, thereby providing the user a visual reference for performing the simulated welding operation. For instance, if it is desired to form a weld along the length a joint 70 of the apparatus 14, the welding simulation device 16 may be used to perform a simulated welding operation along the joint 70 of the model apparatus 68, such as by moving the tip of the gas nozzle 68 along the length of the joint 70.

Moreover, in one embodiment, the model apparatus 68 may be mounted or otherwise secured to a model fixture 72 that has the same or a similar configuration as the fixture 20 housed within the welding chamber 14, thereby further enhancing the realistic experience of performing the simulated welding operation. Thus, in embodiments in which the orientation of the fixture 20 is adjustable, the orientation of the model fixture 72 may also be adjustable. For instance, as shown in FIG. 3, similar to the fixture 20 described above, the model fixture 72 may include one or more displacement mechanisms 28 (e.g., one or more motors) configured to allow the orientation of a top portion 26 of the model fixture 72 to be rotated and/or tilted in one or more directions (e.g., about the three-dimensional axes 30, 32, 34 shown in FIG. 3) relative to a bottom portion 22 of the model fixture 72. In such an embodiment, the displacement mechanism(s) 28 of both fixtures 28, 72 may be communicatively coupled to the controller 60 such that the orientation of each fixture 28, 72 may be controlled simultaneously. For instance, when the orientation of the model fixture 72 is adjusted, it may be desirable to simultaneously adjust the orientation of the fixture 28 contained within the welding chamber 14 such that the fixtures 28, 72 always have the same orientation.

Further, as indicated above, the controller 60 of the disclosed system 10 may generally be configured to track the motion of the simulated welding device 16 as the device 16 is used to perform the simulated welding operation. Thus, in several embodiments, the controller 60 may be communicatively coupled to one or more sensors 74 configured to monitor the position and/or orientation of the welding simulation device 16. For instance, as shown in FIG. 3, one or more sensors 74 may be mounted to and/or within the simulated welding device 16. In such an embodiment, suitable sensor(s) 74 may include, but are not limited to, position/proximity sensors, accelerometers, gyroscopes, electromagnetic sensors, inertia sensors and/or the like. In other embodiments, the controller 60 may be communicatively coupled to a separate motion tracking system 76 (shown in the dashed lines). Such a tracking system 76 may, for example, include one or more components positioned on and/or within the welding simulation device 16 (e.g., one or more sensors, transmitters, receivers and/or the like) and/or one or more components positioned proximal to the welding simulation device 16 (e.g., one or more cameras, transmitters, receivers and/or the like). As is generally understood, suitable motion tracking systems 76 are commercially available from various suppliers, such as INTERSENSE (of Billerica, Mass.), POLHEMUS (of Colchester, Vt.), XSENS (of Culver City, Calif.), and may based on various technologies, such as electromagnetic-based tracking systems, inertia-based tracking systems, vision-based tracking systems and/or the like.

By receiving inputs from the sensor(s) 74 and/or the motion tracking system 76, the controller 60 may be configured to precisely track the motion of the simulated welding device 16, which may then be utilized by the controller 60 to control the robotic welder 32. Specifically, the controller 60 may be configured to transmit suitable control signals to the robotic welder 32 such that the motion of the robotic welder 32 emulates or mimics the motion of the welding simulation device 16. For instance, in several embodiments, the inputs received from the sensor(s) 74 and/or the motion tracking system 76 may be converted by the controller 60 into three-dimensional coordinates and/or vectors representing the instantaneous position and/or orientation of the simulated welding device 16 relative to the model apparatus 68, the model fixture 72 and/or any other suitable reference point. The controller 60 may then utilize such coordinates and/or vectors to control the motion of the robotic welder 32 in a manner that tracks the motion of the welding simulation device 16. For example, in one embodiment, the position and/or orientation of the welding torch 40 relative to the apparatus 12 and/or the fixture 20 may be known and stored within the controller 60. In such an embodiment, the controller 60 may be configured to calibrate the position and/or orientation of the welding simulation device 16 using a simple calibration process, such as by contacting the tip of the welding simulation device 16 at several different locations on the model apparatus 68 and/or model fixture 72, which may then permit the controller 60 to correlate the position and/or orientation of the welding simulation device 16 to the position and/or orientation of the welding torch 40 within the welding chamber 14.

It should be appreciated that the controller 60 may generally comprise any suitable computer, processing unit and/or combination of computers and/or processing units known in the art, including computers and/or processing units that are communicatively coupled to one another via a suitable network (e.g., the internet). Thus, in several embodiments, the controller 60 may include one or more processor(s) and associated memory device(s) configured to perform a variety of computer-implemented functions (e.g., performing the calculations, methods and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 60 to perform various functions including, but not limited to, tracking the motion of the welding simulation device 16, controlling the motion of the robotic welder 32 based on the motion of the welding simulation device 16 and various other suitable computer-implemented functions.

Additionally, as indicated above, the display device 18 may generally provide a means for the user of the welding simulation device 16 to view the interior of the welding chamber 14 and, more particularly, the position of the welding torch 40 relative to the apparatus 14. Thus, it should be appreciated the display device 18 may be configured to be positioned at any suitable location that permits the images displayed by the display device 18 to be viewed by the user as the simulated welding operation is being performed. For instance, in one embodiment, the display device 18 may be configured as a stand-alone unit (e.g., a television or computer monitor) and may be positioned in close proximity to the apparatus model 68 and/or model fixture 72. In other embodiments, the display device 18 may be configured as a head-mounted display device configured to be worn by the user. For instance, as shown in FIG. 3, in one embodiment, the display device 18 may be integrated into a welder's hood 58, such as by replacing the tented lens of the welder's hood 58 with the display device 18. As such, while the user is performing the simulated welding operation, he/she may be able to directly view the apparatus 12 and/or the welding torch 40 within the welding chamber 14, thereby providing the visual effect that the user is actually performing the welding operation on the apparatus 12.

Moreover, in embodiments in which the display device 18 is configured as a head-mounted display device, the controller 60 may be configured to track the movements of the display device (e.g., by tracking the movements of the welder's hood 58) and, based on such movements, adjust the field of view, position and/or orientation of the camera 50 within the welding chamber 14. For instance, similar to the welding simulation device 16 described above, the controller 60 may be communicatively coupled to one or more sensors configured to monitor the position and/or orientation of the display device 18. Specifically, as shown in FIG. 3, in one embodiment, one or more sensors 78 may be mounted to and/or within the welder's hood 58. In other embodiments, the controller 60 may be communicatively coupled to a separate motion tracking system 76 (e.g., an electromagnetic-based tracking system, inertia-based tracking system, vision-based tracking system and/or the like) configured to monitor the position and/or orientation of the display device 18. The controller 60 may then transmit suitable control signals to the camera 50 and/or any other suitable component of the system 10 in order to control the field of view, position and/or orientation of the camera 50. For example, in embodiments in which the camera 50 comprises a PTZ camera, the controller 60 may be configured to pan, tilt and/or zoom the field of view of the camera 50 based on the movements of the display device 18, such as when the user tilts or rotate his head or when the user moves his head closer to or further away from the apparatus model 68. Similarly, in embodiments in which the camera 50 is coupled to a secondary robotic arm 56 (FIG. 2), the movements of the robotic arm 56 may be controlled such that position and/or orientation of the camera 50 relative to the apparatus 12 correspond to the position and/or orientation of the display device 18 relative to the apparatus model 68.

Referring still to FIGS. 1 and 3, in a particular embodiment of the present subject matter, the disclosed system 10 may also include features for providing the user the audible effect of performing an actual welding operation. For example, as shown in FIG. 1, a microphone 80 may be mounted to or otherwise positioned within the welding chamber 14 for recoding the sounds emitted within the chamber 14. In such an embodiment, one or more speakers 82 may be positioned outside the welding chamber 14 and may be configured to generate the sounds recorded by the microphone 80. For example, as shown in FIG. 3, the speaker(s) 82 may be mounted on and/or within the welder's hood 58. As such, the user may be able to hear the pops, cracks and other noises generated within the welding chamber 14 as the welding operation is being performed on the apparatus 12.

It should be appreciated that the present subject matter is also directed to a method for performing remote welding operations an apparatus 12 contained within a welding chamber 14. In several embodiments, the method may generally include performing a simulated welding operation with a welding simulation device 16 positioned outside the welding chamber 14, tracking the movements of the welding simulation device 16 as the simulated welding operation is being performed and controlling a robotic welder 32 positioned within the welding chamber 14 based on the movements of the welding simulation device 16 such that the robotic welder 32 performs an actual welding operation on the apparatus 12.

Additionally, in one embodiment, the method may include capturing images of the actual welding operation as it is being performed and transmitting the images to a display device 18 positioned outside the welding chamber 14. Moreover, in embodiments in which the display device 18 is configured as a head-mounted display device, the method may include tracking the movement of the head-mounted display device and controlling the movement of a robotic arm 56 positioned within the welding chamber 14 based on the movement of the head-mounted display device. Further, in another embodiment, the disclosed method may include adjusting the orientation of at least a portion of a fixture 20 positioned within the welding chamber 14. In addition, in another embodiment, the method may include recording sounds emitted within the welding chamber 14 and generating the sounds with a speaker 82 positioned outside the welding chamber 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for performing remote welding operations on an apparatus, the system comprising:
   a welding chamber configured to house the apparatus;
   a robotic welder positioned within the welding chamber, the robotic welder being configured to perform an actual welding operation on the apparatus;
   a welding simulation device positioned outside the welding chamber, the welding simulation device being configured to be physically moved on as to perform a simulated welding operation corresponding to the actual welding operation;
   a model apparatus positioned outside the welding chamber, the welding simulation device configured to be physically moved relative to the model apparatus to perform the simulated welding operation;
   a fixture positioned within the welding chamber, the apparatus being mounted to the fixture;
   a model fixture positioned outside the welding chamber, the model apparatus being mounted to the model fixture; and
   a controller communicatively coupled to the robotic welder and the welding simulation device, the controller being configured to track the physical movements of the welding simulation device and control movements of the robotic welder based on the physical movements of the welding simulation device such that the movements of the robotic welder emulate the physical movements of the welding simulation device as tracked by the controller;
   wherein:
   an orientation of both the fixture and the model fixture is adjustable; and when the orientation of the model fixture is adjusted, the controller is configured to adjust the orientation of the fixture to match the orientation of the model fixture.

2. The system of claim 1, further comprising an imaging system configured to capture images of the actual welding operation as it is being performed and a display device communicatively coupled to the imaging system, the display device being configured to display images transmitted from the imaging system.

3. The system of claim 2, wherein the imaging system is coupled to a robotic arm positioned within the welding chamber.

4. The system of claim 3, wherein the display device is configured as a head-mounted display device, the controller being configured to track the movements of the head-mounted display device and control the operation of the robotic arm based on the movements of the head-mounted display.

5. The system of claim 4, wherein the head-mounted display device is configured as a welder's hood.

6. The system of claim 1, wherein the robotic welder comprises a robotic arm and a welding torch coupled to the robotic arm.

7. The system of claim 1, further comprising a sensor mounted to or within the welding simulation device, the sensor being configured to monitor at least one of a position or an orientation of the welding simulation device.

8. The system of claim 1, further comprising a microphone configured to record sounds emitted within the welding chamber and a speaker positioned outside the welding chamber, the speaker being configured to generate the sounds recorded by the microphone.

9. The system of claim 1, wherein the welding simulation device is configured as a welding torch.

10. The system of claim 1, wherein the physical movements of the welding simulation device are configured to be manually controlled.

11. The system of claim 1, wherein the welding chamber defines an enclosed, sealed volume.

12. The system of claim 7, wherein the controller is communicatively coupled to the sensor, the controller being configured to track the physical movements of the welding simulation device based on input signals received from the sensor.

13. The system of claim 12, wherein the controller is configured to convert the input signals received from the sensor into at least one of three dimensional coordinates or vectors representing at least one of a current position or a current orientation of the welding simulation device, the controller being configured to control the movements of the robotic welder based on changes in the at least one of the current position or the current orientation of the welding simulation device.

14. The system of claim 7, wherein the sensor comprises at least one of a position sensor, a proximity sensor, an accelerometer, a gyroscope, an electromagnetic sensor or an inertia sensor.

15. The system of claim 1, wherein the controller is configured to calibrate at least one of a position or an orientation of the welding simulation device such that the controller correlates the at least one of the position or the orientation of the welding simulation device to at least one of a position or an orientation of a portion of the robotic welder within the welding chamber.

* * * * *